United States Patent [19]

Abraham et al.

[11] Patent Number: 5,267,471
[45] Date of Patent: Dec. 7, 1993

[54] DOUBLE CANTILEVER SENSOR FOR ATOMIC FORCE MICROSCOPE

[75] Inventors: David W. Abraham, Ossining; Martin P. O'Boyle, Peekskill, both of N.Y.

[73] Assignee: IBM Corporation, Armonk, N.Y.

[21] Appl. No.: 876,339

[22] Filed: Apr. 30, 1992

[51] Int. Cl.$^5$ .................... H01J 37/26; G01N 23/00
[52] U.S. Cl. .................... 73/105; 250/306; 250/307
[58] Field of Search .............. 73/105; 250/306, 307, 250/423 F

[56] References Cited

U.S. PATENT DOCUMENTS

| | | | |
|---|---|---|---|
| Re. 33,387 | 10/1990 | Binnig | 250/306 |
| 4,424,583 | 1/1984 | Uchida | 369/126 |
| 4,600,934 | 7/1986 | Aine et al. | 357/26 |
| 4,668,865 | 5/1987 | Gimzewski et al. | 250/306 |
| 4,670,092 | 6/1987 | Motamedi | 156/643 |
| 4,724,318 | 2/1988 | Binnig | 250/307 |
| 4,783,237 | 11/1988 | Aine et al. | 437/15 |
| 4,800,274 | 1/1989 | Hansma et al. | 250/306 |
| 4,806,755 | 2/1989 | Duerig et al. | 250/306 |
| 4,851,080 | 7/1989 | Howe et al. | 156/647 |
| 4,851,671 | 7/1989 | Pohl | 250/306 |
| 4,883,959 | 11/1989 | Hosoki et al. | 250/306 |
| 4,906,840 | 3/1990 | Zdeblick et al. | 250/306 |
| 4,916,002 | 4/1990 | Carver | 428/139 |
| 4,941,753 | 7/1990 | Wickramasinghe | 250/306 |
| 4,943,719 | 7/1990 | Akamine et al. | 250/306 |
| 4,945,235 | 7/1990 | Nishioka et al. | 250/306 |
| 4,968,585 | 11/1990 | Albrecht et al. | 430/320 |
| 4,992,659 | 2/1991 | Abraham et al. | 250/306 |
| 5,003,815 | 4/1991 | Martin et al. | 73/105 |
| 5,020,376 | 6/1991 | Wall et al. | 73/866.5 |
| 5,021,364 | 6/1991 | Akamine et al. | 437/228 |
| 5,041,783 | 8/1991 | Ohta et al. | 324/158 P |
| 5,047,633 | 9/1991 | Finlan et al. | 250/306 |
| 5,047,637 | 9/1991 | Toda | 73/105 |
| 5,047,649 | 9/1991 | Hodgson et al. | 250/492.2 |
| 5,065,103 | 11/1991 | Slinkman et al. | 250/307 |
| 5,085,070 | 2/1992 | Miller et al. | 73/105 |
| 5,164,791 | 11/1992 | Kubo et al. | 250/306 |

FOREIGN PATENT DOCUMENTS 0047601 2/1988 Japan ..................... 73/105

OTHER PUBLICATIONS

"Kelvin probe force microscopy", M. Nonnenmacher et al., Appl. Phys. Lett. Jun. 24, 1991, pp. 2921-2923.
"Lateral Dopant Profiling In Semiconductors By Force Microscopy Using Capacitive Detection", by D. W. Abraham et al, 12 pages.

Primary Examiner—Hezron E. Williams
Assistant Examiner—George Dombroske
Attorney, Agent, or Firm—Perman & Green

[57] ABSTRACT

An atomic force microscope that performs both atomic force and surface potential measurements on a sample comprises a conductive probe beam that includes two segments, a first segment exhibiting a first mechanical resonant frequency and a second segment exhibiting a second different mechanical resonant frequency. An actuator causes oscillations in the probe beam at the first mechanical resonant frequency. An oscillator applies to the probe beam a signal having a frequency equal to the second mechanical resonant frequency. Due to the potential difference between the probe beam and the sample, a force results that causes the probe beam to vibrate. The probe beam is moved over the sample's surface in a direction parallel to the surface. An optical heterodyne system senses movements of the probe beam at both the first and second resonant frequencies and provides an output signal indicative of the second resonant frequency movement of the probe beam's second segment. In a further embodiment, second and third harmonics of the second resonant frequency are applied to the probe beam and enable the measurement of capacitance changes between the probe beam and the sample surface and changes in capacitance with respect to voltage over the sample's surface.

12 Claims, 2 Drawing Sheets

DOUBLE CANTILEVER SENSOR FOR ATOMIC FORCE MICROSCOPE

FIELD OF THE INVENTION

This invention relates to atomic force microscopy (AFM) and, more particularly, to an improved AFM system that is able to provide surface potential, capacitance and topographical measurements.

BACKGROUND OF THE INVENTION

The development of the scanning tunneling microscope has given rise to a family of scanned-probe microscopes that enable the visualization of submicron substrate features. Additional scanned probe systems have been developed to enable the imaging of surface-related magnetic forces and electrostatic forces. The electrostatic-force microscope employs a vibrating probe which bears an electric charge. The probe's vibration amplitude is affected by electrostatic forces from charges in the sample being scanned. The electrostatic force microscope thus enables the mapping of electrical properties of an underlying microcircuit on a very fine scale. Such microscopes have been used to measure charges, dielectric constants, film thicknesses of insulating layers, photovoltages, and surface electrical potentials.

Nonnenmacher et al. in "Kelvin Probe Force Microscopy", Applied Physics Letters Vol. 58, No. 25, 24 Jun., 1991 pages 2921-2933 describe the application of a capacitive force micrgscope to the determination of potential differences between a probe head and a surface being scanned. The microscope there described employed a modified Kelvin method wherein two conductors are arranged as a closely spaced parallel plate capacitor (one conductor being the probe). A periodic signal applied to the probe induces a force that causes the probe to vibrate at the applied frequency. As the force value is related to the difference in potential between the probe and the surface, the resulting vibration is indicative thereof. The actual measurement is created by adding an additional bucking voltage between the plates until the space therebetween is field free and the resulting force goes to zero. The bucking voltage is thus equal to the potential difference.

A similar system has been applied to the mapping of lateral dopant profiles in semiconductors (e.g. see "Lateral Dopant Profiling in Semiconductors by Force Microscopy Using Capacitive Detection" by Abraham et al., J. Vac. Soc. Technology B, Microelectronics, Process. Phenom. Vol. 9, No. 2, PT.2, Mar., April, 1991, pp 703-706). The system used by Abraham et al. consisted of a tungsten wire etched-cantilever that was several hundred microns in length and mechanically bent in the final 50 microns at a right angle. The tip served as a surface probe during imaging. Piezoelectric transducers scanned the sensor head above the sample. The tip was vibrated at one of its resonance frequencies and its resultant motion was measured using optical heterodyne detection. Shifts in the resonant frequency due to force gradients between the tip and sample caused changes in amplitude of the oscillations, which changes were used in a feedback loop to control the height of the tip above the sample. Surface images, thus obtained, showed contours of constant force gradient.

To measure dopant densities, the tip was biased with a DC voltage (chosen to deplete the surface of the semiconducting sample), plus an AC voltage to induce mechanical oscillation of the tip at a resonant frequency of the cantilever. Amplitude variations in the signal then corresponded primarily to variations in the depletion capacitance and therefore dopant concentration.

To achieve a separation of the measured values, Abraham et al. employed detection of two separate resonances of the cantilever (e.g. a fundamental and second harmonic). The movements of the cantilever in response to the second harmonic energization were small vibrations at the end of the cantilever and more substantial vibrations in its middle. The fundamental resonant vibrations caused substantial movements at the ends of the cantilever and smaller movements in the middle. Hence, for a given excitation, the second resonance was less sensitive than the first resonance.

The patented prior art relating to AFM systems is extensive. U.S. Pat. No. 4,668,865 to Gimzewski et al. describes a scanning tunnelling microscope wherein variations of tunnel current occurring between a sharp tip and a substrate are employed to image the substrate surface. U.S. Pat. Nos. 4,724,318 and Re. 33,387, both to Binnig, include one of the first descriptions of a scanning tunnelling microscope that employs tunnel current for image visualization. U.S. Pat. No. 4,851,671 to Pohl describes an AFM capacitive force measurement system wherein a probe is oscillated and the deviations of the frequency of oscillation are used both to control the distance of the probe from the surface being investigated and to plot an image of the contour of surface potential.

U.S. Pat. No. 4,941,753 to Wickramasinghe describes another AFM capacitive microscope of the absorption type. U.S. Pat. No. 4,992,659 to Abraham et al describes the application of an AFM to the measurement of magnetic fields above the surface of a sample and U.S. Pat. No. 5,047,633 to Finlan et al describes a multiprobe AFM for visualizing the topography of a sample being scanned.

A number of patents describe various methods of fabricating microtips and/or cantilevers for AFM systems, environmental sensing, etc. Such disclosures can be found in the following U.S. Pat. Nos.: 5,020,376 to Wall et al; 5,021,364 to Akamine et al; 4,670,092 to Motamedi; 4,968,585 to Albrecht et al; 4,943,719 to Akamine et al; 4,916,002 to Carver; 4,906,840 to Zdeblick et al. and 4,800,274. Similar types of structures for accellerometers are found in U.S. Pat. Nos. 4,783,237; 4,600,934; and 4,851,080.

Additional patents relating to STM and AFM instruments teach the coupling of an objective lens to AFM and STM systems, a micromechanical sensor head which measures AFM cantilever motion by the sensing of tunnelling current, a holding mechanism for probe tips in AFMs and STMs, and a fine adjustment mechanism for STMs. Those teachings can be found in the following U.S. Pat. Nos.: 5,041,783 to Ohta et al; 4,806,755 to Duerig et al; 4,883,959 to Oski et al. and 4,945,235 to Nishioka et al. STM-like probes also have been used to produce fine line patterns on insulating surfaces (see Hodgson et al in U.S. Pat. No. 5,047,649) and the concept of applying an oscillatory force to a pick-up (in other fields) is shown in Uchida, U.S. Pat. No. 4,424,583.

Accordingly, it is an object of this invention to provide an improved AFM system that is capable of making highly accurate topographical and electrical surface measurements of a sample.

It is another object of this invention to provide an improved cantilever beam probe for an AFM which enables decoupling of surface potential measurements from topographical measurements.

It is yet another object of this invention to provide an AFM which enables, through selective application of energizing frequencies, a sensing of changes of capacitance with respect to surface potential of a sample.

SUMMARY OF THE INVENTION

An atomic force microscope that performs both atomic force and surface potential measurements on a sample comprises a conductive probe beam that includes two segments, a first segment exhibiting a first mechanical resonant frequency and a second segment exhibiting a second different mechanical resonant frequency. An actuator causes oscillations in the probe beam at the first mechanical resonant frequency. An oscillator applies to the probe beam a signal having a frequency equal to the second mechanical resonant frequency. Due to the potential difference between the probe beam and the sample, a force results that causes the probe beam to vibrate. The probe beam is moved over the sample's surface in a direction parallel to the surface. An optical heterodyne system senses movements of the probe beam at both the first and second resonant frequencies and provides an output signal indicative of the second resonant frequency movement of the probe beam's second segment. In a further embodiment, second and third harmonics of the second resonant frequency are applied to the probe beam and enable the measurement of capacitance changes between the probe beam and the sample surface and changes in capacitance with respect to voltage over the sample's surface.

DETAILED DESCRIPTION OF THE INVENTION

Figure 1:
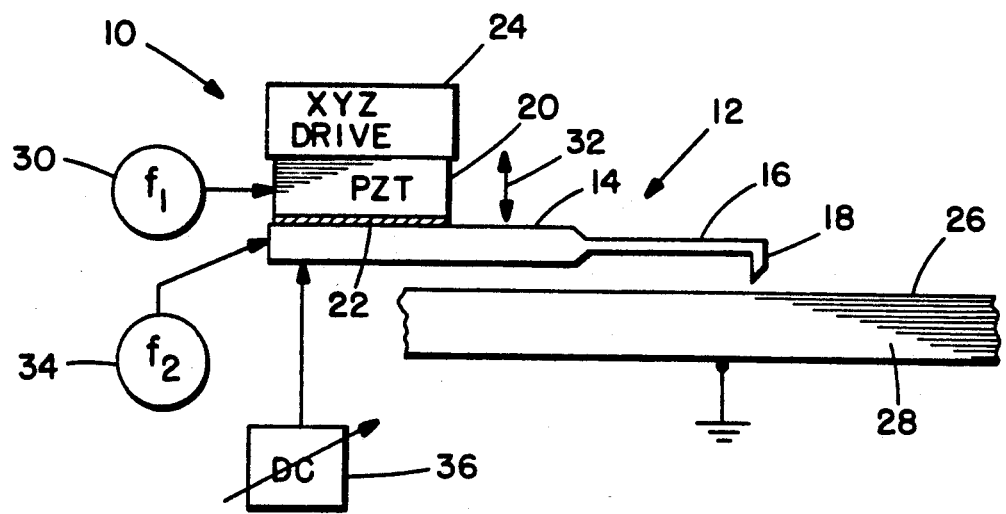
FIG. 1 is a schematic side view of an AFM probe beam for use with the invention hereof.

In FIG. 1, an AFM probe beam 12 includes a first segment 14 that exhibits a mechanical resonant frequency $f_1$. A smaller cross section lower mass second segment 16 exhibits a higher mechanical resonant frequency $f_2$ and has a probe point 18. Probe beam 12 is conductive and is mounted for movement by a PZT actuator 20. Probe beam 12 is insulated from PZT 20 by a dielectric layer 22. PZT actuator 20 is further mounted on an xyz drive 24 that enables the movement of probe beam 12 about surface 26 of a sample 28.

PZT actuator 20 is preferably a bimorph actuator that has applied thereto a signal of frequency $f_1$ from oscillator 30. PZT actuator 20 thus causes beam 12 to reciprocally move in the vertical direction, indicated by arrows 32, at the resonant frequency $f_1$ of probe beam segment 14. The reciprocal movement causes both segments 14 and 16 to resonate at frequency $f_1$.

Oscillator 34 applies a signal of frequency $f_2$ directly to probe beam 12. Additionally, a variable DC source 36 applies a DC potential to probe beam 12.

In the known manner of capacitive scanning microscopes, a capacitance exists between the end of tip 18 and surface 26 of sample 28. That capacitance varies in accordance with surface potential variations at surface 26. The application of the $f_2$ frequency signal to probe 12 results in segment 16 moving at its resonant frequency ($f_2$) if there is a potential difference between tip 18 and surface 26. As the surface potential varies on surface 26, the magnitude of the $f_2$ oscillation of segment 16 changes accordingly. By adjusting the DC potential level applied by DC source 36 to probe 16 to a level that matches the surface potential at surface 26, the DC electrostatic force between tip 18 and surface 26 is negated and oscillations of probe beam segment 16 at $f_2$ cease. It is only when a DC electrostatic potential is present between tip 18 and surface 26, that oscillations occur at $f_2$ in probe beam segment 16.

A benefit of the probe beam system shown in FIG. 1 is that the two frequencies of oscillation of probe beam 12 are decoupled and that each is separately controllable. The oscillations of probe beam 12 at $f_1$ are directly controlled by the applied signal to PZT actuator 20. Beam probe segment 16 also oscillates at $f_1$, but in addition it oscillates at frequency $f_2$, as long as a potential difference exists between tip 18 and surface 26. When that potential difference is zeroed, the movement of segment 16 becomes strictly a function of the operation of PZT 20. Thus, by appropriate monitoring of the movement of beam probe segment 16, the two oscillating frequencies $f_1$ and $f_2$ can be detected and separated to perform independent, phenomena sensing functions in an AFM.

Figure 2:
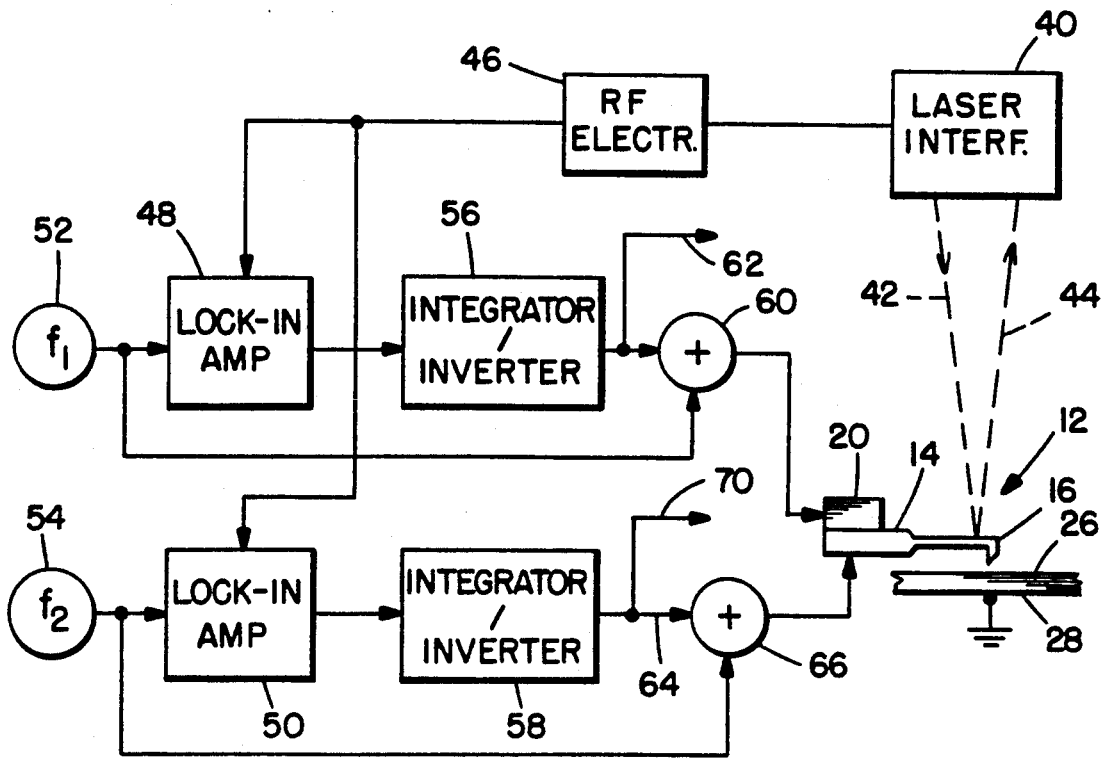
FIG. 2 is a block diagram of an AFM which enables both topographical and surface potential measurements using the improved probe beam of the invention.

A block diagram of a system incorporating an AFM control mechanism for the system of FIG. 1 is shown in FIG. 2. A laser interferometer 40 focuses an optical beam 42 onto probe beam segment 16 and senses the movements thereof through phase variations in reflected optical beam 44. Within laser interferometer 40, reflected beam 44 is sensed and electrical signals are derived, indicative of the movements of probe beam segment 16. As above described, those signals will include both frequency components $f_1$ and $f_2$ in the event that a DC potential difference exists between probe beam segment 16 and surface 26 of sample 28.

Laser interferometer 40 applies its output to an RF electronics module 46 where the signals are amplified and filtered to remove noise. While laser interferometer 40 and RF electronics module 46 may operate in either a homodyne or heterodyne fashion, heterodyne operation is preferred for stability purposes. The output from RF electronics module 46 is a signal waveform that has both $f_1$ and $f_2$ components. That output is fed to a pair of lock in amplifiers 48 and 50. Also applied as inputs to lock-in amplifiers 48 and 50, respectively, are signals from oscillator 52 at $f_1$ and oscillator 54 at $f_2$.

In the known manner, a lock-in amplifier will produce either a positive or negative dc voltage whose amplitude is dependent on the vibration amplitude at $f_1$. As a result, if the feedback $f_1$ signal component to lock-in amplifier 48 changes in amplitude, the output will proportionally change in amplitude.

Integrator 56 smooths the output of lock-in amplifier 48, inverts it and applies it as one input to a summer 60. An $f_1$ signal from oscillator 52 is also fed to summer 60. As a result, a feedback signal to PZT 20 is altered in value in such a manner as to attempt to correct the amplitude change between the two input signals to lock-in amplifier 48—and to achieve a stabilization of probe beam 12 in the known manner. An output signal from integrator 56 is taken via line 62 as an indication of the topography of sample 28.

Lock-in amplifier 50 and integrator 58 operate in the same manner as above described, but with respect to the $f_2$ signal energy emanating from RF electronics module 46. Integrator 58 smooths the output of lock-in amplifier 50 and inverts it so that the potential level on conductor 64 is an inverted DC level that is proportional to the change in amplitude of the $f_2$ signal components in the output of RF electronics module 46. That DC level is applied to a summer 66, in addition to the $f_2$ signal from oscillator 54. The signals are combined in summer 66 and applied, as a feedback signal, to probe beam 12 to control its $f_2$ oscillation.

If the DC level applied to probe 12 is either greater than or less than the surface potential of sample 28, the oscillation of beam probe segment 16 will either lead or lag (respectively) the phase of the applied $f_2$ signal from oscillator 54. Thus, the feedback system operates to adjust the feed back DC level from integrator/inverter 58 so that it slowly varies to continually adjust the DC level on probe 12 to equal the surface potential on sample 28.

As will be recalled, so long as the DC potential on probe beam 12 and the surface potential on sample 28 are equal, beam segment 16 does not oscillate at the $f_2$ frequency. Therefore, if there is a phase lead between the fed back signal and the output of oscillator 54, (indicating that the potential of probe 12 is higher than the surface potential of sample 28 and that beam probe segment 16 is oscillating at $f_2$), the output of integrator 58 drops until oscillations cease. When oscillations again begin, the feedback will cause the output of integrator 58 to again change, etc. In this manner the fed back DC level (as applied on output line 70) is directly related to the surface potential on sample 28.

Figure 3:
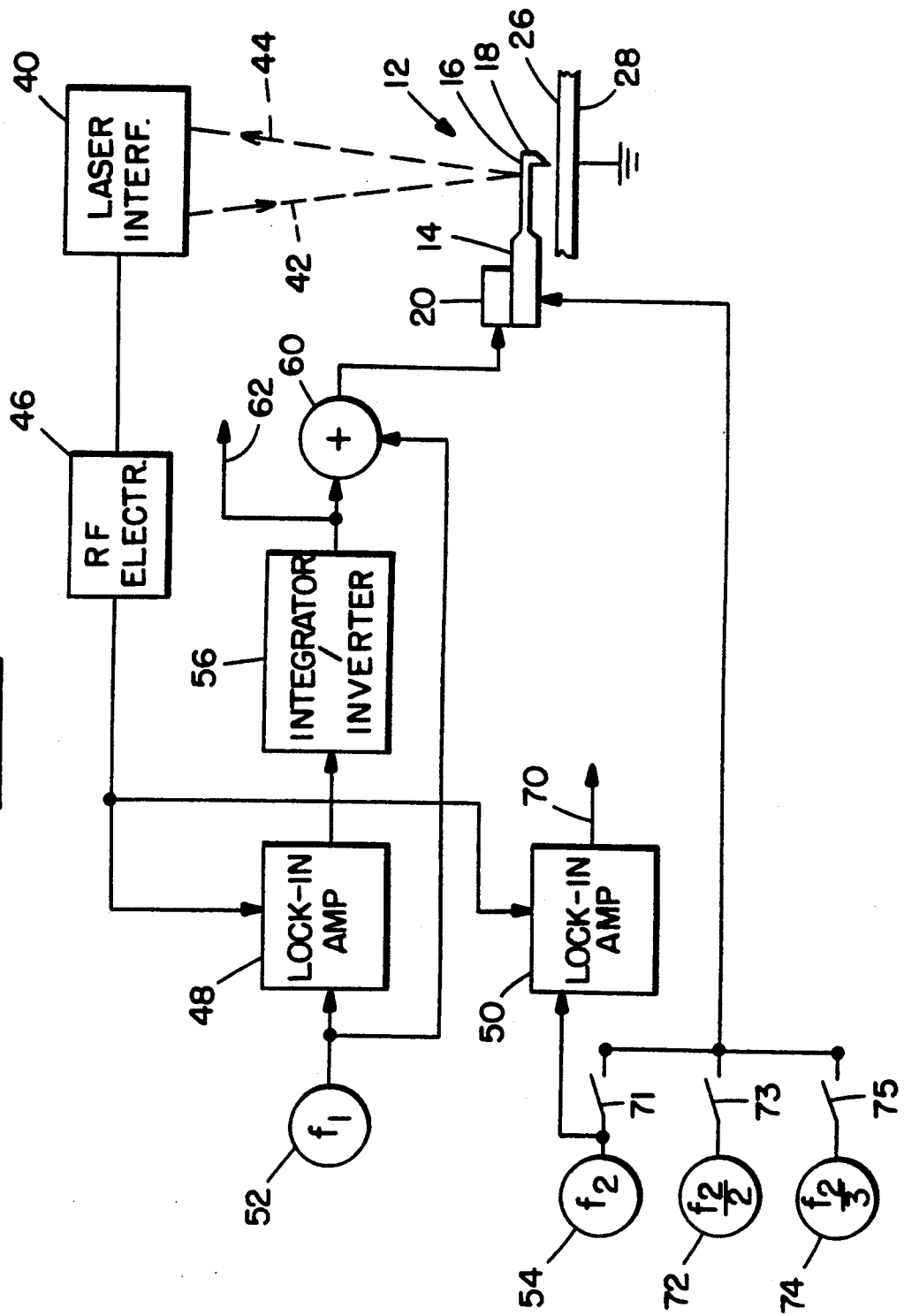
FIG. 3 is a second embodiment of the invention wherein harmonic energizations are applied to the probe beam to enable measurement of selected electrical characteristics of a sample.

Turning now to FIG. 3, an embodiment of the invention is shown that enables probe beam 12 to operate as a capacitive force microscope. The portions of the circuit of FIG. 3 that are identical to those shown in FIG. 2 are similarly numbered. Examination of the circuit of FIG. 3 will reveal that the feedback network from lock-in amplifier 50 to probe beam 12 has been eliminated. A switch 71 has been imposed between the input to lock-in amplifier 50 and oscillator 54. Additional oscillators 72 and 74 are also provided and are connected by switches 73 and 75 to the input to lock-in amplifier 50. The frequency of oscillator 54 remains at the resonant frequency of beam probe segment 16. The frequency of oscillator 72 is one half that of oscillator 54 and thus is on half the resonant frequency of beam probe segment 16. The frequency of oscillator 74 is one third that of oscillator 54 (i.e., one third of the resonant frequency of beam probe segment 16). An output is taken from line 70 that emanates from lock-in amplifier 50.

As will be hereafter understood, when switch 71 is closed and switches 73 and 75 are open, the system shown in FIG. 3 operates as a capacitive force microscope. In such a circumstance, beam probe segment 60 oscillates at frequency $f_2$ and the amplitude of the oscillations are affected by the capacitive force existing between tip 18 and sample 28. Changes in oscillation amplitude are sensed by laser interferometer 40 and are fed via RF electronics module 46 to lock-in amplifier 50. As a result, the output on line 70 is a slowly varying signal that follows changes in amplitude of the oscillations of beam probe segment 16.

The system of FIG. 3 can be converted to a capacitance force microscope that is sensitive to capacitance values between tip 18 and sample 28, unaffected by surface voltage variations. This is achieved by opening switches 71 and 75 and closing switch 73, so that a signal that is one half the resonance frequency of beam probe segment 16 is applied to beam probe 12. It is to be noted that frequency source 52 remains connected to lock-in amplifier 50 and provides an $f_2$ signal thereto.

With switch 73 closed, the application of a signal that is one half the resonance frequency of beam probe segment 16 still causes segment 16 to oscillate at its resonant frequency $f_2$. Under these conditions however, tip 18 is only affected by the capacitance present between itself and sample 28 and not the surface potentials extant thereon. As a result, the amplitude of oscillations of beam probe segment 16 are altered by the forces exerted by the capacitive changes, which changes are sensed by laser interferometer 40 and fed back through RF electronics module 46 to lock-in amplifier 50. As before, lock-in amplifier 50 extracts from the fed back signal those portions that result from the $f_2$ oscillations of beam probe segment 16. The amplitude of those oscillations are converted to a proportional level on output line 70 to provide an indication of capacitive changes as beam probe 12 is moved relative to sample 28.

By opening switches 71 and 73 and closing switch 75 to apply a signal to beam probe 12 that is one third of the resonant frequency of beam probe segment 16, it can be shown that the amplitude of the resultant oscillations of beam probe segment 16 is affected only by capacitance changes that are voltage dependent. Such changes occur when the sample is a doped semiconductor. This allows discrimination from other sources of capacitance change such as dielectric variations, oxide thickness changes, etc. The response of lock-in amplifier 50 is as aforedescribed, with the output on line 70 evidencing such voltage dependent capacitance changes.

The following mathematical analysis will aid in an understanding of the operation of the system in FIG. 3. The capacitance force exhibited between probe tip 18 and sample 28 can be expressed as shown in equation 1 below:

$$\text{force } f = 1/2 \; V^2 \frac{\partial C}{\partial z} \qquad (1)$$

where f = capacitive force
   v = voltage across capacitance plates
   z = distance between plates The voltage between tip 18 and sample surface 26 can be expressed as follows:

$$v(t) = (V_{dc} - V_{sp}) + V_{ac} \, e^{jwt} \qquad (2)$$

where $V_{dc}$ = DC voltage on probe beam
   $V_{sp}$ = sample surface potential
   $V_{ac}$ = AC excitation voltage applied to probe beam
   $w = 2\pi f$ The capacitance existing between tip 18 and sample 28 can be expressed as shown in equation 3 below:

$$C(V) = C(V_{dc} - V_{sp}) + \frac{\partial C}{\partial z} V_{ac} e^{jwt} \quad (3)$$

Given equations 1-3, the forces exerted on probe beam 12 as a result of the application of a DC voltage thereto can be expressed as follows:

$$F(dc) = 1/2 (V_{dc} - V_{sp})^2 \frac{\partial C}{\partial z} \quad (4)$$

The force exerted on beam probe 12 when a signal is of frequency $f_2$ is expressed as shown in equation 5:

$$(\text{at } f_2) = F(w) = e^{jwt} \left[ \frac{\partial C}{\partial z} (V_{dc} - V_{sp}) V_{ac} + 1/2 \frac{\partial^2 C}{\partial z \partial V} (V_{dc} - V_{sp})^2 V_{ac} \right] \quad (5)$$

For most practical purposes, the second expression in equation 5 can be ignored as its value is small compared to the value of the first part of the expression.

If an excitation signal that is at one half the resonant frequency of beam probe segment 16 is now applied, the beam probe will be sensitive to the forces that are generated as a result of changes in capacitance alone. Equation 6 illustrates the relationship.

$$(\text{at } f_2/2),$$

$$F(2w) = e^{j2wt} \left[ 1/2 \partial c / \partial z \cdot V_{ac}^2 + \frac{\partial^2 C}{\partial z \partial V} V_{ac}^2 (V_{dc} - V_{sp}) \right] \quad (6)$$

If a signal having a frequency that is at one third the resonant frequency of beam probe segment 16 is applied, equation 7 shows that the force experienced by beam probe segment 16 is only affected by changes in capacitance resulting from dopant variations in the sample.

$$(\text{at } f_2/3), \; F(3/w) = e^{j3wt} [\tfrac{1}{2} \partial^2 C / \partial z \partial V \cdot V_{ac}^3] \quad (7)$$

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An atomic force microscope for performing atomic force and surface potential measurements on a sample, the combination comprising:

a conductive probe beam including two segments, a first segment exhibiting a mechanical fundamental resonant frequency of $f_1$ and a second segment exhibiting a mechanical fundamental resonant frequency of $f_2$;

actuator means mechanically coupled to said probe beam for oscillating said probe beam at said $f_1$ frequency;

oscillator means electrically connected to said probe beam for applying a signal of frequency $f_2$ thereto;

means for inducing relative movement between said sample and said probe beam in a direction that is transverse to a surface of said sample; and means for sensing movements of said probe beam that are orthogonal to the surface of said sample and for providing an output signal indicative of movement of said second segment of said probe beam at said $f_2$ frequency.

2. The atomic force microscope of claim 1 wherein $f_2$ is greater than $f_1$.

3. The atomic force microscope of claim 2 wherein said first segment of said probe has a larger mass and cross section than said second segment.

4. The atomic force microscope of claim 1 further comprising:

feedback means for applying a bias voltage to said probe beam, and responsive to said output signal from said sensing means to change said bias voltage towards a value of surface potential on said sample adjacent said probe beam.

5. The atomic force microscope of claim 4, wherein said sensing means and feedback means comprise:

an interferometer for sensing a laser beam reflected from said second segment of said probe beam;

oscillator means for providing a signal of frequency $f_2$; and lock-in amplifier means responsive to the output of said oscillator means and to an output from said interferometer that includes an $f_2$ signal component, to provide said bias voltage.

6. An atomic force microscope for determining characteristics of a sample, comprising:

a conductive probe beam including first and second segments, said first segment exhibiting a mechanical fundamental resonant frequency at $f_1$ and said second segment exhibiting a mechanical fundamental resonant frequency at $f_2$, $f_2$ being greater than $f_1$;

actuator means mechanically coupled to said probe beam for oscillating said probe beam at said $f_1$ frequency;

oscillator means connected to said probe beam for applying an AC signal thereto, said AC signal having a component frequency of said $f_2$ frequency; and interferometric means for sensing movements of said second segment of said probe beam and for providing an output indicative of movements of said second segment at said $f_2$ frequency.

7. The atomic force microscope as recited in claim 6 wherein said AC signal is equal in frequency to $f_2$.

8. The atomic force microscope as recited in claim 6 wherein said AC signal exhibits a frequency of $f_2/2$.

9. The atomic force microscope as recited in claim 6 wherein said AC signal exhibits a frequency of $f_2/3$.

10. The atomic force microscope as recited in claim 7 wherein said interferometer means comprises:

an interferometer for producing a signal including $f_2$ signal components that are indicative of $f_2$ frequency vibrations of said second segment;

a lock-in amplifier responsive to said interferometer signal and said AC signal for providing an output indicative of amplitude changes of said interferromer signal that occur at a frequency of said AC signal; and integrator means for applying a feedback bias to said probe beam in response to said lock-in amplifier's output, said integrator means altering said feedback bias in response to said output from said lock-in amplifier so that it is more nearly equal to a surface potential manifested by said sample.

11. An atomic force microscope as recited in claim 8, wherein said interferometer means comprises:
   an interferometer for producing a signal including $f_2$ signal components that are indicative of $f_2$ frequency vibrations of said second segment; and
   a lock-in amplifier responsive to said signal from said interferometer and said $f_2/2$ AC signal to provide an output manifesting a level that is proportional to capacitive forces existing between said second segment and said sample.

12. An atomic force microscope as recited in claim 9, wherein said interferometer means comprises:
   an interferometer for producing a signal including $f_2$ signal components that are indicative of $f_2$ frequency vibrations of said second segment; and
   a lock-in amplifier responsive to said signal from said interferometer and said $f_2/3$ AC signal to provide an output indicative manifesting a level that is proportional to capacitive changes due charge states in said sample.

* * * * *